(12) United States Patent
Jiang

(10) Patent No.: US 11,869,266 B2
(45) Date of Patent: Jan. 9, 2024

(54) DISPLAY MODULE AND MANUFACTURING METHOD THEREOF

(71) Applicant: Wuhan China Star Optoelectronics Semiconductor Display Technology Co., Ltd., Wuhan (CN)

(72) Inventor: Guodong Jiang, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/979,880

(22) PCT Filed: Jun. 15, 2020

(86) PCT No.: PCT/CN2020/096146
§ 371 (c)(1),
(2) Date: Sep. 11, 2020

(87) PCT Pub. No.: WO2021/217810
PCT Pub. Date: Nov. 4, 2021

(65) Prior Publication Data
US 2023/0196820 A1    Jun. 22, 2023

(30) Foreign Application Priority Data

Apr. 27, 2020    (CN) .......................... 202010343910.5

(51) Int. Cl.
*G06K 9/28*    (2006.01)
*G06V 40/13*    (2022.01)
*H04M 1/02*    (2006.01)

(52) U.S. Cl.
CPC ...... *G06V 40/1306* (2022.01); *H04M 1/0266* (2013.01)

(58) Field of Classification Search
CPC .................... G06V 40/1306; H04M 1/0266
See application file for complete search history.

(56) References Cited

U.S. PATENT DOCUMENTS

| | | | |
|---|---|---|---|
| 2018/0267673 A1* | 9/2018 | Kim ................... | G06V 40/1306 |
| 2019/0102006 A1 | 4/2019 | Suzuki | |
| 2019/0197281 A1 | 6/2019 | Choi et al. | |
| 2019/0197282 A1 | 6/2019 | Gong et al. | |
| 2019/0197284 A1* | 6/2019 | Park ....................... | G06F 21/32 |
| 2021/0019018 A1 | 1/2021 | Guo et al. | |
| 2021/0117637 A1* | 4/2021 | Lee .................... | G06V 40/1306 |

* cited by examiner

*Primary Examiner* — Brian Werner
(74) *Attorney, Agent, or Firm* — Menachem Nathan; Nathan & Associates

(57) ABSTRACT

A display module and a manufacturing method thereof are provided. The display module includes a display panel and a fingerprint identification module disposed in the display panel, wherein the display panel includes a first substrate, a second substrate located above the first substrate, and a functional layer prepared and disposed above the second substrate, and the fingerprint identification module is disposed between the first substrate and the second substrate. The present application realizes a technical effect of a simplified manufacturing process of the display module and an overall simple structure through integrating the fingerprint identification module into the display panel.

15 Claims, 5 Drawing Sheets

DISPLAY MODULE AND MANUFACTURING METHOD THEREOF

FIELD OF INVENTION

The present application relates to the field of display technology, and specifically to a display module and a manufacturing method thereof.

BACKGROUND OF INVENTION

With development of display industry, people's expectations for display terminals have become increasingly higher. Expectations of users for display terminals with high screen-to-body ratios drive a continual development of full screen cell phones, and borders of display screens also become narrower and narrower. Meanwhile, in order to increase screen-to-body ratios, unlocking methods of cell phones continue to change, for example, by disposing a fingerprint unlock at a rear of a cell phone, or by substituting the fingerprint unlock with facial identification, etc. However, these unlocking methods do not satisfy most people's usage preference. Therefore, under-display fingerprint unlock has emerged.

SUMMARY OF INVENTION

Conventional in-display fingerprint unlock independently disposes a fingerprint unlock module under a cell phone display panel, and perform unlock to the cell phone through optical or ultrasound identification. Because the fingerprint identification module is independently disposed under the display panel, during manufacturing, the display panel needs to be finished manufacturing before manufacturing the fingerprint identification module under the display panel, having a more complicated manufacturing process and structure.

As a first aspect, embodiments of the present application provide a display module that includes a display panel and a fingerprint identification module disposed in the display panel, wherein the display panel includes a first substrate, a second substrate located above the first substrate, and a functional layer prepared and disposed above the second substrate, the fingerprint identification module is disposed between the first substrate and the second substrate, and four sides of the fingerprint identification module overlap four sides of the display panel;

Wherein the fingerprint identification module includes:
A driving circuit layer prepared on the first substrate;
A piezoelectric material layer prepared on the driving circuit layer;
An electrode layer prepared on the piezoelectric material layer; and
A first buffer layer prepared on the electrode layer.
In some embodiments, the functional layer includes:
A second buffer layer prepared on the second substrate;
An active layer prepared on the second buffer layer;
A first insulating layer disposed on the active layer;
A source electrode connected to the active layer;
A drain electrode connected to the active layer;
Agate electrode disposed on the first insulating layer;
A second insulating layer disposed between the gate electrode, and the source electrode and the drain electrode;
A pixel electrode layer connected to the source electrode or the drain electrode; and
A planarization layer disposed between the pixel electrode layer, and the drain electrode and the source electrode.

In some embodiments, the active layer includes a channel area; and a source area and a drain area which are located on two sides of the channel area, the source area is connected to the source electrode, and the drain area is connected to the drain electrode.

In some embodiments, the gate electrode corresponds to the channel area.

In some embodiments, the display panel includes a display area and a non-display area, the non-display area includes an exterior lead line combination area, the display area is connected to the exterior lead line combination area through a plurality of lead lines, the display module further includes a driving chip, and the lead lines are connected to the driving chip after passing the exterior lead line combination area.

In some embodiments, a plurality of first via holes are defined in the driving circuit layer, a plurality of second via holes are defined in the electrode layer, each of the first via holes corresponds to one of the second via holes, each of the first via holes corresponds to one of the lead lines, and each of the lead lines is connected to the driving circuit layer and the electrode layer through a corresponding first via hole and the second via holes.

As a second aspect, embodiments of the present application further provide a display module that includes a display panel and a fingerprint identification module disposed in the display panel, wherein the display panel includes a first substrate, a second substrate located above the first substrate, and a functional layer prepared and disposed above the second substrate, the fingerprint identification module is disposed between the first substrate and the second substrate.

In some embodiments, the fingerprint identification module includes:
A driving circuit layer prepared on the first substrate;
A piezoelectric material layer prepared on the driving circuit layer;
An electrode layer prepared on the piezoelectric material layer; and
A first buffer layer prepared on the electrode layer.
In some embodiments, the functional layer includes:
A second buffer layer prepared on the second substrate;
An active layer prepared on the second buffer layer;
A first insulating layer disposed on the active layer;
A source electrode connected to the active layer;
A drain electrode connected to the active layer;
Agate electrode disposed on the first insulating layer;
A second insulating layer disposed between the gate electrode, and the source electrode and the drain electrode;
A pixel electrode layer connected to the source electrode or the drain electrode; and
A planarization layer disposed between the pixel electrode layer, and the drain electrode and the source electrode.

In some embodiments, the active layer includes a channel area; and a source area and a drain area which are located on two sides of the channel area, the source area is connected to the source electrode, and the drain area is connected to the drain electrode.

In some embodiments, the gate electrode corresponds to the channel area.

In some embodiments, the display panel includes a display area and a non-display area, the non-display area includes an exterior lead line combination area, the display area is connected to the exterior lead line combination area through a plurality of lead lines.

In some embodiments, the display module further includes a driving chip, and the lead lines are connected to the driving chip after passing the exterior lead line combination area.

In some embodiments, a plurality of first via holes are defined in the driving circuit layer, a plurality of second via holes are defined in the electrode layer, each of the first via holes corresponds to one of the second via holes, each of the first via holes corresponds to one of the lead lines, and each of the lead lines is connected to the driving circuit layer and the electrode layer through a corresponding first via hole and the second via holes.

In some embodiments, four sides of the fingerprint identification module overlap four sides of the display panel.

In some embodiments, a width of the fingerprint identification module is equal to a width of the display panel, a height of the fingerprint identification module is less than a height of the display panel, and a side of the fingerprint identification module perpendicular to a height direction overlaps a side of the display panel perpendicular to the height direction.

In some embodiments, a width of the fingerprint identification module is equal to a width of the display panel, a height of the fingerprint identification module is less than a height of the display panel, and sides of the fingerprint identification module perpendicular to a height direction do not overlap a side of the display panel perpendicular to the height direction.

In some embodiments, a width of the fingerprint identification module is less than a width of the display panel, a height of the fingerprint identification module is less than a height of the display panel, and four sides of the fingerprint identification module do not overlap four sides of the display panel.

As a third aspect, embodiments of the present application further provide a manufacturing method of a display module that includes:

Preparing a first substrate;
Preparing a fingerprint identification module on the first substrate;
Preparing a second substrate on the fingerprint identification module; and
Preparing a functional layer of a display panel on the second substrate.

In some embodiments, the step of preparing the fingerprint identification module on the first substrate includes:

Preparing a driving circuit layer on the first substrate;
Preparing a piezoelectric material layer on the driving circuit layer;
Preparing an electrode layer on the piezoelectric material layer; and
Preparing a first buffer layer on the electrode layer.

Embodiments of the present invention provide a display module, and through integrating a fingerprint identification module into a display panel, an integrated manufacturing of the display panel and the fingerprint identification module is realized. In comparison with conventional technology, embodiments of the present invention realize a technical effect of full-screen fingerprint identification through integrating the fingerprint identification module into the display panel.

DETAILED DESCRIPTION OF PREFERRED EMBODIMENTS

Figure 1:
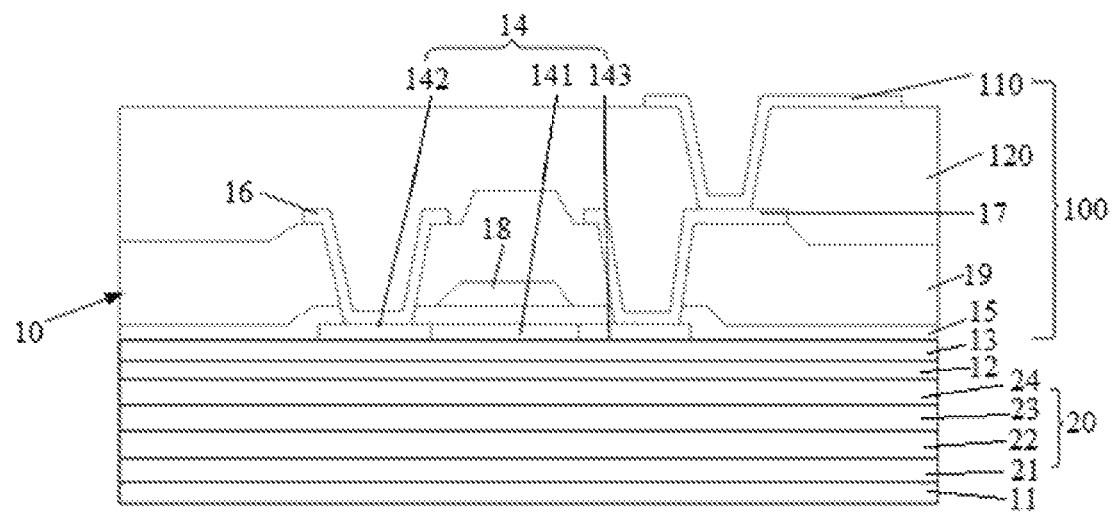
FIG. 1 is a structural schematic diagram of a display module according to a first embodiment of the present invention.

The embodiments of the present invention are described in detail hereinafter. Examples of the described embodiments are given in the accompanying drawings. It should be noted that the following embodiments are intended to illustrate and interpret the present invention, and shall not be construed as causing limitations to the present invention. Similarly, the following embodiments are part of the embodiments of the present invention and are not the whole embodiments, and all other embodiments obtained by those skilled in the art without making any inventive efforts are within the scope protected by the present invention.

In description of embodiments of the present invention, it should be understood that terms that indicates orientation or relation of position such as "center", "longitudinal", "lateral", "length", "width", "thickness", "upper", "lower", "front", "rear", "left", "right", "vertical", "horizontal", "top", "bottom", "interior", "exterior" are based on orientation or relation of position accompanying drawings show. They are simply for purpose of description of the present invention and simplifying of description, and do not mean or suggest the devices or components have a specified orientation and constructed and operated in a specified orientation; therefore, it should not be understood as limitation of the present invention. Furthermore, terms "first" and "second" are used simply for purpose of description and cannot be understood to mean or suggest relative importance or implicitly mean amount of the technical features. Therefore, features with terms "first" and "second" can mean or implicitly include one or more of the features. In description of the present invention, "multiple" means two or more unless otherwise clearly and concretely specified.

In embodiments of the present invention, the term "illustrative" is used to express "used as an example, a case, or description". Any embodiments described as "illustrative" in embodiments of the present invention are not necessary explained to be more advantageous than other embodiments. In order to make any person of ordinary skill in the art realize and use embodiments of the present invention, following description is given. In the following description, embodiments of the present invention give details for a purpose of explanation. It should be understood that a person of ordinary skill in the art can realize that embodiments of the present invention can be realized even these specific details are not used. In other embodiments, well-known structures and processes are not described in detail to avoid unnecessary details making description of embodiments of the present invention difficult. Therefore, embodiments of the present invention are not to limit described embodiments, and should be in consistent with broadest scope of principles and features disclosed by embodiments of the present invention.

Embodiments of the present invention provide a display module and a manufacturing method thereof. Detailed description is separately given in the following.

First Embodiment

FIG. 1 is a structural schematic diagram of a display module according to a first embodiment of the present invention. As shown in FIG. 1, the display module includes a display panel 10, and a fingerprint identification module 20 disposed in the display panel 10, wherein, the display panel 10 includes a first substrate 11, a second substrate 12 located above the first substrate 11, and a functional layer 100 prepared above the second substrate 12, and the fingerprint identification module 20 is disposed between the first substrate 11 and the second substrate 12.

In some embodiments of the present application, a material of the first substrate 11 is the same as that of the second substrate 12. The first substrate 11 and the second substrate 12 can be made of transparent materials including one of glass, polyethylene terephthalate (PET), poly(ethylene naphthalate) (PEN), or polyimide.

In some embodiments of the present application, through disposing the fingerprint identification module 20 between the first substrate 11 and the second substrate 12 of the display panel 10, an integrated manufacturing of the display panel 10 and the fingerprint identification module 20 can be realized, thereby gaining a simple structure of the display module and facilitating the manufacturing process.

In some embodiments of the present application, the fingerprint identification module 20 can be an ultrasound fingerprint identification module or an optical fingerprint identification module. However, the optical fingerprint identification module has requirements for an optical signal, and cleanliness of a finger, optical designs of the display module, etc. will affect an identification effect, which leads to an unsatisfactory user experience. Therefore, in embodiments of the present application, the fingerprint identification module 20 is the ultrasound fingerprint identification module.

Specifically, as shown in FIG. 1, the fingerprint identification module 20 includes:

A driving circuit layer 21 prepared on the first substrate 11 and configured to drive the fingerprint identification module 20;

A piezoelectric material layer 22 prepared on the driving circuit layer 21, wherein a piezoelectric material includes poly(vinylidene fluoride), polyvinylidene fluoride, aluminum nitride, composite oxides of a perovskite structure of lead zirconate titanate piezoelectric, etc.;

An electrode layer 23 prepared on the piezoelectric material layer 22 and made of a conductive material, wherein the conductive material can be a silver paste; and A first buffer layer 24 prepared on the electrode layer 23. The first buffer layer 24 is configured to form a plain surface on the electrode layer 23, and prevent moisture or other impurity elements from intruding the electrode layer 23. The first buffer layer 24 can include single or multiple layers formed by silicon nitride and/or silica.

Figure 2:
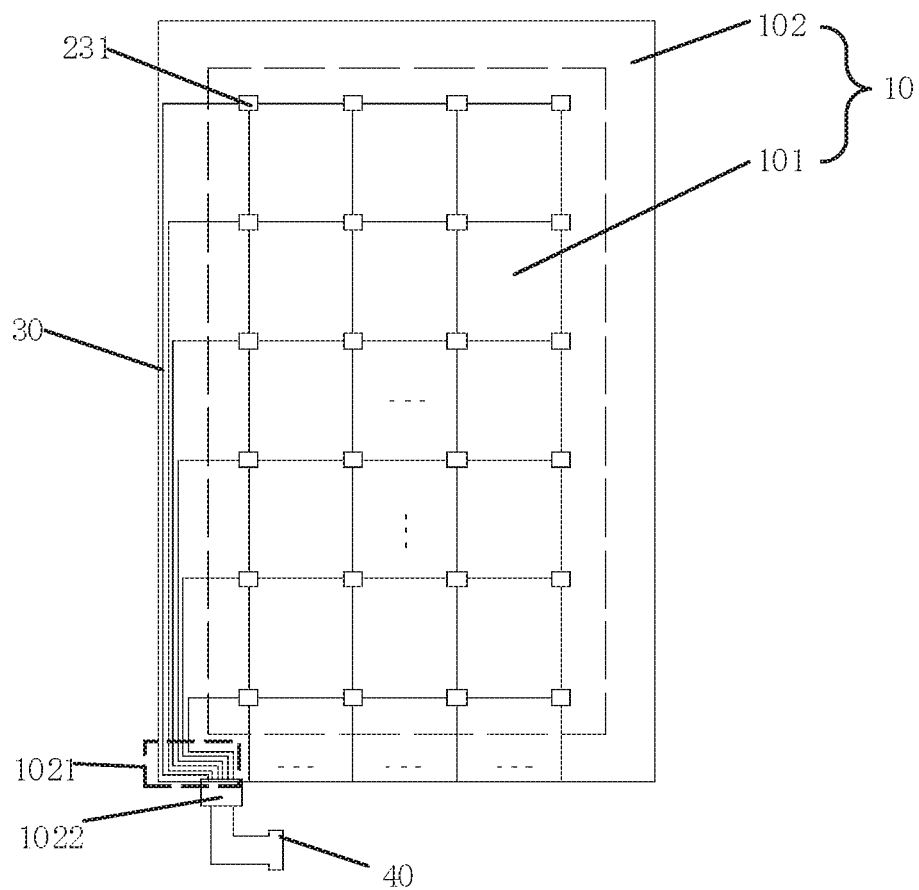
FIG. 2 is a schematic diagram of connection between the display module and a driving chip according to the first embodiment of the present invention.

In some embodiments of the present application, as shown in FIG. 2, the display module further includes a driving chip 40 configured to drive the fingerprint identification module 20 to perform fingerprint identification. Specifically, the driving chip 40 is connected to the electrode layer 23 and the driving circuit layer 21, and configured to control operation of the electrode layer 23 and receive an electrical signal of the driving circuit layer 21.

Wherein, the driving chip 40 can be an application specific integrated circuit (ASIC).

An operation principle of the fingerprint identification module 20 is that the exterior driving chip 40 applies a high frequency electrical signal to the electrode layer 23, and thereafter the electrode layer 23 conducts the high frequency electrical signal to the piezoelectric material layer 22, thereby making the piezoelectric material layer emit ultrasound. The ultrasound is reflected after being transmitted upward, arriving at a surface of the display panel that is configured to display pictures, and contacting a user's finger, and thereafter the piezoelectric material layer 22 receives the emitted ultrasound and transforms it into an electrical signal that is transmitted to the exterior driving chip 40 after a corresponding processing (e.g. amplification) performed in the driving circuit layer 21, and converted into a picture in the driving chip 40, thereby identifying a fingerprint.

In some embodiments of the present application, the exteriorly disposed driving chip 40 is connected to the electrode layer 23 and the driving circuit layer 21 through a plurality of lead lines 30. In order to prevent unnecessary effects caused by wiring of the lead lines 30 on display of the display module and fingerprint identification, a plurality of first via holes (not shown) are defined in the driving circuit layer 21, a plurality of second via holes 231 are defined in the electrode layer 23, and the first via holes are defined corresponding to the second via holes 231. Each of the first via holes corresponds to one lead line 30, and the lead lines 30 correspond to the second via holes 231 through the first via holes and are connected to the driving circuit layer 21 and the electrode layer 23, thereby realizing connection of the driving chip 40 to the driving circuit layer 21 and the electrode layer 23, without affecting display effect of the display module and fingerprint identification function. It should be understood that, because the first via holes and the second via holes 231 completely overlap each other in a direction perpendicular to the display panel 10, only the second via holes 231 can be seen in FIG. 2, and the first via holes are located right below the second via holes 231.

Specifically, as shown in FIG. 2, the display panel 10 includes a display area 101 and a non-display area 102, the non-display area 102 includes an exterior lead line combination area 1021, the display area 101 is connected to the exterior lead line combination area 1021 through the plurality of lead lines 30, and the lead lines 30 are connected to the driving chip 40 after passing the exterior lead line combination area 1021.

Embodiments of the present application include a plurality of lead lines 30, and in order to reduce pins of an exterior driving chip and increase driving chip 40 integrity, in some embodiments of the present application, the non-display area 102 further includes a line-switching area 1022. One end of the line-switching area 1022 is connected to the plurality of leas lines 30, and the other end is connected to the driving chip 40. The line-switching area 1022 includes at least one multiplexer (MUX) circuit to reduce a number of lead lines 30, thereby reducing a pin number required by the driving chip 40 and increasing driving chip 40 integrity.

In some embodiments of the present application, as shown in FIG. 1, the functional layer 100 of the display panel 10 includes:

A second buffer layer 13 prepared on the second substrate 12. It should be understood that the second buffer layer 13 has a same material as that of the first buffer layer 24. Similarly, the second buffer layer 13 also can include single or multiple layers formed by silicon nitride and/or silica.

An active layer 14 prepared on the second buffer layer 13. The active layer 14 can be formed by amorphous silicon or polycrystalline silicon semiconductor.

A first insulating layer 15 disposed on the active layer 14. The first insulating layer 15 can be formed by inorganic insulating materials such as silicon dioxide ($SiO_2$), silicon oxynitride (SiON), alumina ($Al_2O_3$), titanium dioxide ($TiO_2$), tantalum pentoxide ($Ta_2O_5$), hafnium oxide ($HfO_2$), zirconium dioxide ($ZrO_2$), barium strontium titanate oxide (BST), lead zirconate titanate (PZT), etc. It should be understood that the first insulating layer 15 also can be a single layer or multiple layer structure.

A source electrode 16 connected to the active layer 14.

A drain electrode 17 connected to the active layer 14.

A gate electrode 18 disposed on the first insulating layer 15.

Wherein, the source electrode 16, the drain electrode 17, and the gate electrode 18 can include single or multiple layers formed by at least one metal selected from aluminum (Al), platinum (Pt), palladium (Pd), silver (Ag), magnesium (Mg), gold (Au), nickel (Ni), neodymium (Nd), iridium (Ir), chrome (Cr), lithium (Li), calcium (Ca), molybdenum (Mo), titanium (Ti), tungsten (W), and copper (Cu).

A second insulating layer 19 disposed between the gate electrode 18 and the source electrode 16 or the drain electrode 17. The second insulating layer 19 has a same material as that of the first insulating layer 15.

A pixel electrode layer 110 connected to the source electrode 16 or the drain electrode 17. The pixel electrode layer 110 can be made of transparent conductive materials that can include at least one of indium tin oxide (ITO), indium zinc oxide (IZO), zinc oxide (ZnO), indium oxide ($In_2O_3$), indium gallium oxide (IGO), or aluminum-doped zinc oxide (AZO).

A planarization layer 120 disposed between the pixel electrode layer 110 and the source electrode 16 or the drain electrode 17. The planarization layer 120 is disposed on the second insulating layer 19 to cover the source electrode 16 and the drain electrode 17.

In some embodiments of the present application, the active layer 14 includes a channel area 141 and a source area 142 and drain area 143 doped with ion impurities on two sides of the channel area 141. The source area 142 is connected to the source electrode 16, and the drain area 143 is connected to the drain electrode 17.

In some embodiments of the present application, the gate electrode 18 corresponds to the channel area 141.

Figure 3:
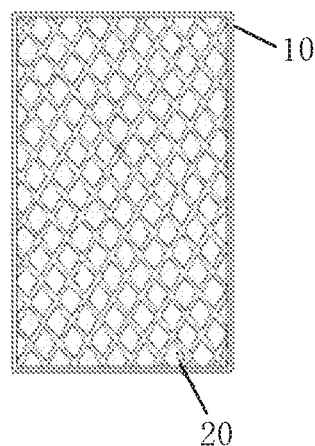
FIG. 3 is a schematic diagram of a fingerprint identification disposal area of the display module according to the first embodiment of the present invention.

In some embodiments of the present application, it is a full-screen fingerprint identification of the display module. As shown in FIG. 3, the fingerprint identification module 20 fills the display panel 10, that is, fingerprint identification is available on the whole display panel 10.

Second Embodiment

Figure 4:
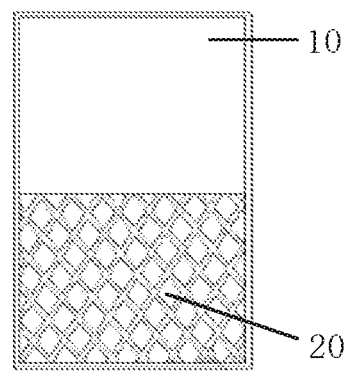
FIG. 4 is a schematic diagram of a fingerprint identification disposal area of a display module according to a second embodiment of the present invention.

FIG. 4 is a schematic diagram of a fingerprint identification disposal area of a display module according to a second embodiment of the present invention. A structure of the display module according to the second embodiment is identical to that according to the first embodiment; the difference is that the fingerprint identification module 20 of the present embodiment is disposed at the bottom of the display panel 10, a width of the fingerprint identification module 20 is equal to a width of the display panel 10, and a height of the fingerprint identification module 20 is less than a height of the display panel 10, wherein a side of the fingerprint identification module 20 overlaps a side of the display panel 10, thereby realizing partial fingerprint identification on the display panel 10.

Third Embodiment

Figure 5:
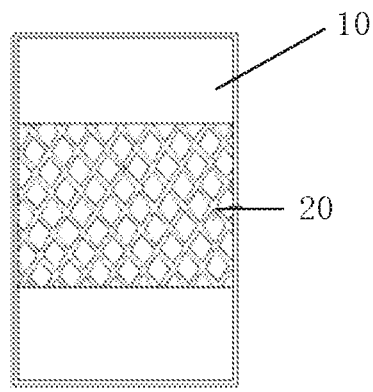
FIG. 5 is a schematic diagram of a fingerprint identification disposal area of a display module according to a third embodiment of the present invention.

FIG. 5 is a schematic diagram of a fingerprint identification disposal area of a display module according to a third embodiment of the present invention. A structure of the display module according to the third embodiment is identical to that according to the first embodiment; the difference is that the fingerprint identification module 20 of the present embodiment is disposed in the middle of the display panel 10, a width of the fingerprint identification module 20 is equal to a width of the display panel 10, and a height of the fingerprint identification module 20 is less than a height of the display panel 10, wherein two sides of the fingerprint identification module 20 do not overlap two sides of the display panel 10, thereby realizing partial fingerprint identification on the display panel 10.

Fourth Embodiment

Figure 6:
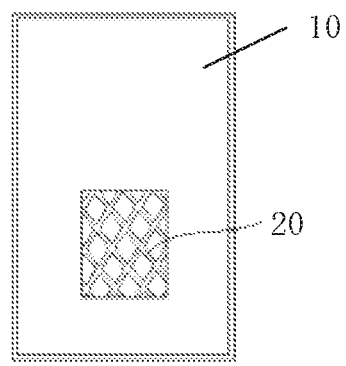
FIG. 6 is a schematic diagram of a fingerprint identification disposal area of a display module according to a fourth embodiment of the present invention.

FIG. 6 is a schematic diagram of a fingerprint identification disposal area of a display module according to a fourth embodiment of the present invention. A structure of the display module according to the fourth embodiment is identical to that according to the first embodiment; the difference is that the fingerprint identification module 20 of the present embodiment is disposed at the bottom of the display panel 10, a width of the fingerprint identification module 20 is less than a width of the display panel 10, and a height of the fingerprint identification module 20 is less than a height of the display panel 10, wherein four sides of the fingerprint identification module 20 do not overlap four sides of the display panel 10, thereby realizing partial fingerprint identification on the display panel 10.

In summary, different sizes of the fingerprint identification module 20 of the present application can be manufactured according to practical situations, and the module can be manufactured at any place of the display panel 10, thereby realizing partial or full-screen fingerprint identification on the display panel 10.

Fifth Embodiment

Figure 7:
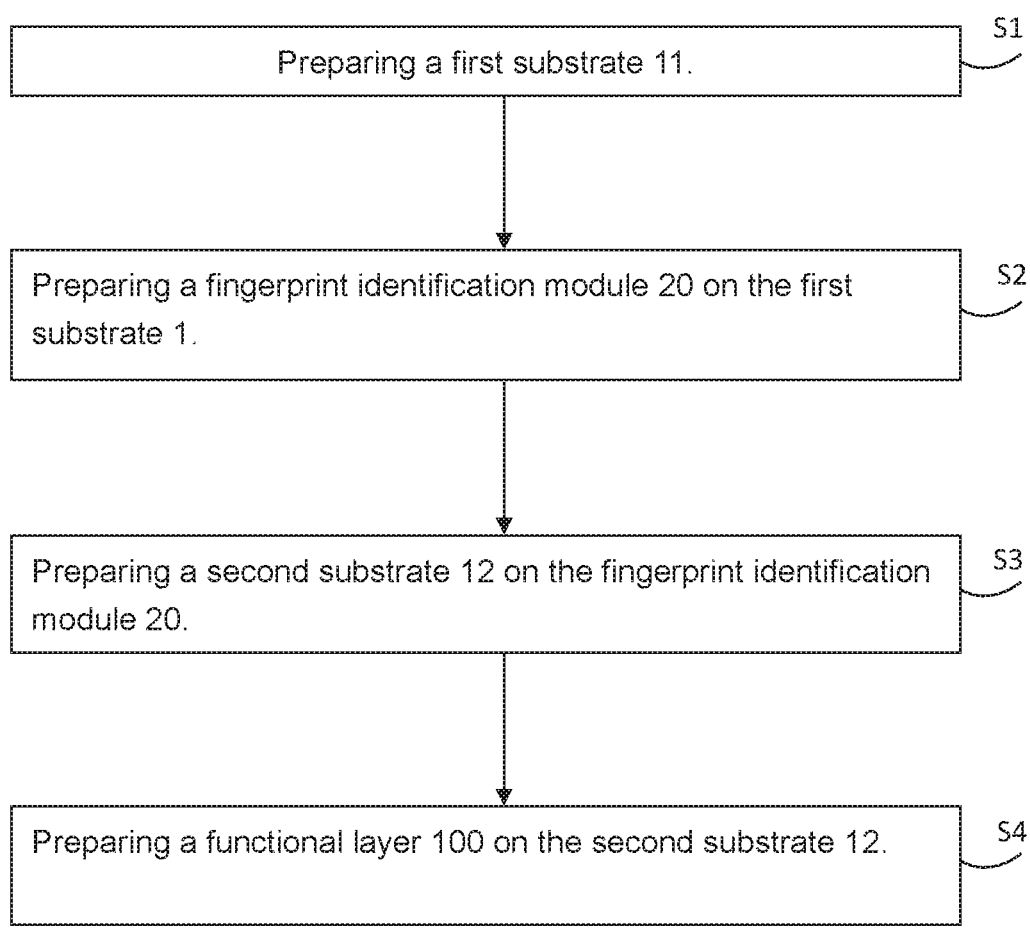
FIG. 7 is a flowchart of a manufacturing method of a display module according to a fifth embodiment of the present invention.

The present application further provides a manufacturing method of a display module. As shown in FIG. 7, the manufacturing method of the display module includes:
Step S1, preparing a first substrate 11;
Step S2, preparing a fingerprint identification module 20 on the first substrate 11;
Step S3, preparing a second substrate 12 on the fingerprint identification module 20; and
Step S4, preparing a functional layer 100 on the second substrate 12.

Figure 8:
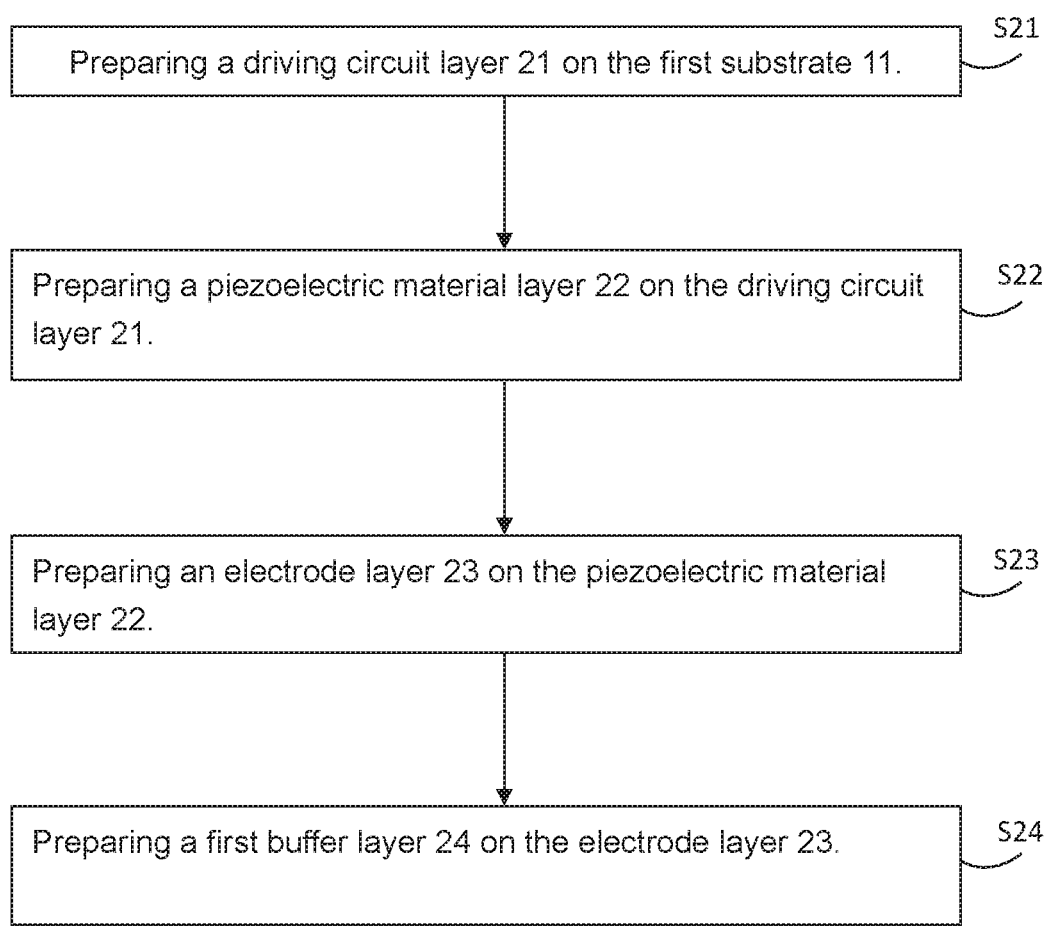
FIG. 8 is a flowchart of step S2 according to the fifth embodiment of the present invention.

In some embodiments of the present application, as shown in FIG. 8, step S2 includes:

Step S21, preparing a driving circuit layer 21 on the first substrate 11. Wherein, the driving circuit layer 21 can be prepared on the first substrate 11 through sputtering and etching.

Step S22, preparing a piezoelectric material layer 22 on the driving circuit layer 21. Wherein, the piezoelectric material layer 22 vibrates under the effect of an electric field and produces ultrasound signals.

Step S23, preparing an electrode layer 23 on the piezoelectric material layer 22. The electrode layer 23 is configured to produce electric field signals.

Step S24, preparing a first buffer layer 24 on the electrode layer 23. The first buffer layer 24 is configured to protect the electrode layer 23.

Materials of various layers and functions of the fifth embodiment are the same as those of the first embodiment and detailed description is omitted here.

The foregoing describes the display module and the manufacturing method thereof according to the present invention in detail. It should be understood that illustrative embodiments described above are descriptive, intended to facilitate understanding of the approach and main idea of the present invention, and not intended to limit the present invention. Description of features or aspects in each illustrative embodiment should generally be considered to apply to similar features or aspects of other illustrative embodiments. Although illustrative embodiments describe the present invention, they can suggest to those skilled in the art making variations and modifications. The present invention intends to include the variations and modifications within the scope of the appended claims, and many changes and modifications to the described embodiments can be carried out without departing from the scope and the spirit of the present invention that is intended to be limited only by the appended claims.

What is claimed is:

1. A display module, comprising:
   a display panel comprising:
      a first substrate;
      a second substrate located above the first substrate; and
      a functional layer, prepared and disposed above the second substrate, and comprising:
         a second buffer layer prepared on the second substrate;
         an active layer prepared on the second buffer layer;
         a first insulating layer disposed on the active layer;
         a source electrode connected to the active layer;
         a drain electrode connected to the active layer;
         a gate electrode disposed on the first insulating layer;
         a second insulating layer disposed between the gate electrode and the source electrode and the drain electrode;
         a pixel electrode layer connected to the source electrode or the drain electrode; and
         a planarization layer disposed between the pixel electrode layer and the drain electrode and the source electrode; and
   a fingerprint identification module, disposed in the display panel, disposed between the first substrate and the second substrate, and comprising:
      a driving circuit layer prepared on the first substrate;
      a piezoelectric material layer prepared on the driving circuit layer;
      an electrode layer prepared on the piezoelectric material layer; and
      a first buffer layer prepared on the electrode layer,
   wherein four sides of the fingerprint identification module overlap four sides of the display panel.

2. The display module as claimed in claim 1, wherein the active layer comprises a channel area, and a source area and a drain area which are located on two sides of the channel area, the source area is connected to the source electrode, and the drain area is connected to the drain electrode.

3. The display module as claimed in claim 2, wherein the gate electrode corresponds to the channel area.

4. The display module as claimed in claim 1, wherein the display panel comprises a display area and a non-display area, the non-display area comprises an exterior lead line combination area, the display area is connected to the exterior lead line combination area through a plurality of lead lines, the display module further comprises a driving chip, and the lead lines are connected to the driving chip after passing the exterior lead line combination area.

5. The display module as claimed in claim 4, wherein a plurality of first via holes are defined in the driving circuit layer, a plurality of second via holes are defined in the electrode layer, each of the first via holes corresponds to one of the second via holes, each of the first via holes corresponds to one of the lead lines, and each of the lead lines is connected to the driving circuit layer and the electrode layer through the corresponding first via hole and the second via hole.

6. A display module, comprising:
   a display panel comprising:
      a first substrate;
      a second substrate located above the first substrate; and
      a functional layer, prepared and disposed above the second substrate, and comprising:
         a second buffer layer prepared on the second substrate;
         an active layer prepared on the second buffer layer;
         a first insulating layer disposed on the active layer;
         a source electrode connected to the active layer;
         a drain electrode connected to the active layer;
         a gate electrode disposed on the first insulating layer;
         a second insulating layer disposed between the gate electrode and the source electrode and the drain electrode;
         a pixel electrode layer connected to the source electrode or the drain electrode; and
         a planarization layer disposed between the pixel electrode layer and the drain electrode and the source electrode; and
   a fingerprint identification module, disposed in the display panel, disposed between the first substrate and the second substrate, and comprising:
      a driving circuit layer prepared on the first substrate;
      a piezoelectric material layer prepared on the driving circuit layer;
      an electrode layer prepared on the piezoelectric material layer; and
      a first buffer layer prepared on the electrode layer.

7. The display module as claimed in claim 6, wherein the active layer comprises a channel area, and a source area and a drain area which are located on two sides of the channel area, the source area is connected to the source electrode, and the drain area is connected to the drain electrode.

8. The display module as claimed in claim 7, wherein the gate electrode corresponds to the channel area.

9. The display module as claimed in claim 8, wherein the display panel comprises a display area and a non-display area, the non-display area comprises an exterior lead line combination area, and the display area is connected to the exterior lead line combination area through a plurality of lead lines.

10. The display module as claimed in claim 9, wherein the display module further comprises a driving chip, and the lead lines are connected to the driving chip after passing the exterior lead line combination area.

11. The display module as claimed in claim 10, wherein a plurality of first via holes are defined in the driving circuit layer, a plurality of second via holes are defined in the electrode layer, each of the first via holes corresponds to one of the second via holes, each of the first via holes corresponds to one of the lead lines, and each of the lead lines is connected to the driving circuit layer and the electrode layer through the corresponding first via hole and the second via hole.

12. The display module as claimed in claim 6, wherein a width of the fingerprint identification module is equal to a width of the display panel, a height of the fingerprint identification module is less than a height of the display panel, and a side of the fingerprint identification module perpendicular to a height direction overlaps a side of the display panel perpendicular to the height direction.

13. The display module as claimed in claim 6, wherein a width of the fingerprint identification module is equal to a width of the display panel, a height of the fingerprint identification module is less than a height of the display panel, and sides of the fingerprint identification module perpendicular to a height direction do not overlap a side of the display panel perpendicular to the height direction.

14. The display module as claimed in claim 6, wherein a width of the fingerprint identification module is less than a width of the display panel, a height of the fingerprint identification module is less than a height of the display panel, and four sides of the fingerprint identification module do not overlap four sides of the display panel.

15. A manufacturing method of a display module, comprising following steps:
preparing a first substrate;
preparing a fingerprint identification module on the first substrate;
preparing a second substrate on the fingerprint identification module; and
preparing a functional layer of a display panel on the second substrate, wherein the functional layer comprises:
a second buffer layer prepared on the second substrate;
an active layer prepared on the second buffer layer;
a first insulating layer disposed on the active layer;
a source electrode connected to the active layer;
a drain electrode connected to the active layer;
a gate electrode disposed on the first insulating layer;
a second insulating layer disposed between the gate electrode and the source electrode and the drain electrode;
a pixel electrode layer connected to the source electrode or the drain electrode; and
a planarization layer disposed between the pixel electrode layer and the drain electrode and the source electrode; and
wherein the step of preparing the fingerprint identification module on the first substrate comprises:
preparing a driving circuit layer on the first substrate;
preparing a piezoelectric material layer on the driving circuit layer;
preparing an electrode layer on the piezoelectric material layer; and
preparing a first buffer layer on the electrode layer.

* * * * *